United States Patent
Chen et al.

(10) Patent No.: US 7,616,399 B1
(45) Date of Patent: Nov. 10, 2009

(54) DISK DRIVE SERVO CONTROL TECHNIQUES TO PRESERVE PES CONTINUITY

(75) Inventors: Min Chen, San Rafael, CA (US); Zhi Wang, Irvine, CA (US); Duc T. Phan, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 365 days.

(21) Appl. No.: 11/635,904

(22) Filed: Dec. 7, 2006

(51) Int. Cl.
*G11B 5/596* (2006.01)
(52) U.S. Cl. .................................. 360/77.08
(58) Field of Classification Search ....................... None
See application file for complete search history.

(56) References Cited

U.S. PATENT DOCUMENTS

| | | | |
|---|---|---|---|
| 5,825,579 A * | 10/1998 | Cheung et al. ........... | 360/77.08 |
| 5,995,316 A | 11/1999 | Stich | |
| 6,069,764 A | 5/2000 | Morris et al. | |
| 6,091,567 A | 7/2000 | Cooper et al. | |
| 6,101,064 A * | 8/2000 | Shepherd ................. | 360/77.08 |
| 6,130,798 A * | 10/2000 | Chang et al. ............. | 360/77.07 |
| 6,141,175 A | 10/2000 | Nazarian et al. | |
| 6,188,539 B1 * | 2/2001 | Elliot et al. ............... | 360/77.08 |
| 6,310,742 B1 | 10/2001 | Nazarian et al. | |
| 6,369,974 B1 * | 4/2002 | Asgari et al. ................. | 360/75 |
| 6,429,995 B1 * | 8/2002 | Dobbek et al. ........... | 360/77.08 |
| 6,522,493 B1 * | 2/2003 | Dobbek et al. ........... | 360/77.08 |
| 6,545,830 B1 | 4/2003 | Briggs et al. | |
| 6,556,367 B2 * | 4/2003 | Takahashi ................ | 360/77.08 |
| 6,690,523 B1 | 2/2004 | Nguyen et al. | |
| 6,707,635 B1 | 3/2004 | Codilian et al. | |
| 6,757,119 B2 | 6/2004 | Leow et al. | |
| 6,760,185 B1 * | 7/2004 | Roth et al. ............... | 360/77.08 |
| 6,826,006 B1 | 11/2004 | Melkote et al. | |
| 6,847,502 B1 | 1/2005 | Codilian | |
| 6,847,503 B2 | 1/2005 | Zhang et al. | |
| 6,859,341 B2 | 2/2005 | Min et al. | |

(Continued)

OTHER PUBLICATIONS

Thesis of Alexei Sacks PhD, Position Error Signal Generation in Magnetic Disk Drives, Carnegie-Mellon University.

(Continued)

*Primary Examiner*—Hoa T Nguyen
*Assistant Examiner*—James L Habermehl
(74) *Attorney, Agent, or Firm*—Blakely, Sokoloff, Taylor & Zafman (57) ABSTRACT

A disk drive comprising a moveable head, a disk, and a servo controller that implements servo control techniques to preserve PES continuity during track following operations is disclosed. The disk includes a plurality of tracks in which a substantial majority of the tracks include a plurality of servo sectors having a plurality of servo bursts that are utilized in track following operations. The servo controller controls track following operations with the moveable head and implements operations to preserve PES continuity during track following. These operations include: dividing tracks of the disk into a plurality of zones wherein each zone includes zone boundaries; and utilizing a PES equation for each zone to generate a PES value based upon read servo bursts wherein each zone PES equation includes a normalizing factor to account for boundary conditions associated with zone boundaries to preserve PES value continuity between zones.

22 Claims, 7 Drawing Sheets

U.S. PATENT DOCUMENTS

| | | |
|---|---|---|
| 6,975,480 B1 | 12/2005 | Codilian et al. |
| 6,999,267 B1 | 2/2006 | Melkote et al. |
| 7,027,256 B1 | 4/2006 | Subrahmanyam et al. |
| 2002/0034038 A1 | 3/2002 | Ahn |
| 2003/0112544 A1 | 6/2003 | Harmer et al. |
| 2003/0112545 A1 | 6/2003 | Hanson et al. |
| 2003/0112546 A1 | 6/2003 | Hanson et al. |
| 2003/0184909 A1 | 10/2003 | Zhang et al. |
| 2004/0021977 A1 | 2/2004 | Lim et al. |
| 2004/0225933 A1 | 11/2004 | Seng et al. |
| 2006/0024033 A1 | 2/2006 | Cho |
| 2007/0053098 A1* | 3/2007 | Schell et al. .............. 360/77.04 |

OTHER PUBLICATIONS

Dennis Cahalan, Kiran Chopra, Effects of MR Head Track Profile Characteristics on Servo Performance, IEEE Transactions on Magnetics, vol. 30 No. 6, Nov. 1994.

* cited by examiner

DISK DRIVE SERVO CONTROL TECHNIQUES TO PRESERVE PES CONTINUITY

BACKGROUND OF THE INVENTION

1. Field of the Invention

The present invention relates to disk drives. More particularly, the present invention relates to disk drive servo control techniques that preserve position error signal (PES) continuity during track following operations.

2. Description of the Prior Art and Related Information

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes a phase lock loop (PLL) field, a servo synch mark (SSM) field, a track identification (TKID), a sector ID field having a binary encoded sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input.

Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk.

Position error signals (PESs) are an essential feedback signal for the servo control system during track following operations. The PES signal may be derived from the read servo bursts as the head flies over the servo bursts of the servo sectors of the disk. Various PES demodulation methods to calculate PES values from the bursts profiles are known.

Unfortunately, bursts ratio discontinuities, sometimes referred to as "glitches" may occur during PES demodulation. These PES glitches often introduce position errors into the servo control loop, degrading the performance of servo calibrations, and in extreme cases, may destabilize the track follow loop.

SUMMARY OF THE INVENTION

The present invention relates to disk drives. More particularly, the present invention relates to servo control techniques to preserve position error signal (PES) continuity during track following operations in a disk drive.

In one embodiment of the present invention, a disk drive comprising a moveable head, a disk, and a servo controller that implements servo control techniques to preserve PES continuity during track following operations is disclosed. The disk includes a plurality of tracks in which a substantial majority of the tracks include a plurality of servo sectors having a plurality of servo bursts that are utilized in track following operations. The servo controller controls track following operations with the moveable head and implements operations to preserve PES continuity during track following. These operations include: dividing tracks of the disk into a plurality of zones wherein each zone includes zone boundaries; and utilizing a PES equation for each zone to generate a PES value based upon read servo bursts wherein each zone PES equation includes a normalizing factor to account for boundary conditions associated with zone boundaries to preserve PES value continuity between zones.

In another embodiment of the present invention, a method to perform track following operations in a disk drive is disclosed. The method comprises moving a head relative to a disk having a plurality of tracks in which a substantial majority of the tracks include a plurality of servo sectors having a plurality of servo bursts that are utilized in track following operations. The method further comprises controlling track following operations with the moveable head in order to preserve position error signal (PES) continuity by: dividing tracks of the disk into a plurality of zones in which each zone includes zone boundaries; and utilizing a PES equation for each zone to generate a PES value based upon read servo bursts wherein each zone PES equation includes a normalizing factor to account for boundary conditions associated with zone boundaries to preserve PES value continuity between zones.

In yet another embodiment of the present invention, a processor-readable medium having stored thereon instructions is disclosed, which when executed by a processor of a disk drive, causes the disk drive to perform operations related to servo control techniques to preserve PES continuity. These operations comprise: moving a head relative to a disk having a plurality of tracks in which a substantial majority of the tracks include a plurality of servo sectors having a plurality of servo bursts utilized in track following operations and controlling track following operations with the moveable head in order to preserve position error signal (PES) continuity. Preserving position error signal (PES) continuity during track following is accomplished by: dividing tracks of the disk into a plurality of zones wherein each zone includes zone boundaries; and utilizing a PES equation for each zone to generate a PES value based upon read servo bursts wherein each zone PES equation includes a normalizing factor to account for boundary conditions associated with zone boundaries to preserve PES value continuity between zones.

The foregoing and other features of the invention are described in detail below and are set forth in the appended claims.

DETAILED DESCRIPTION

Figure 1:
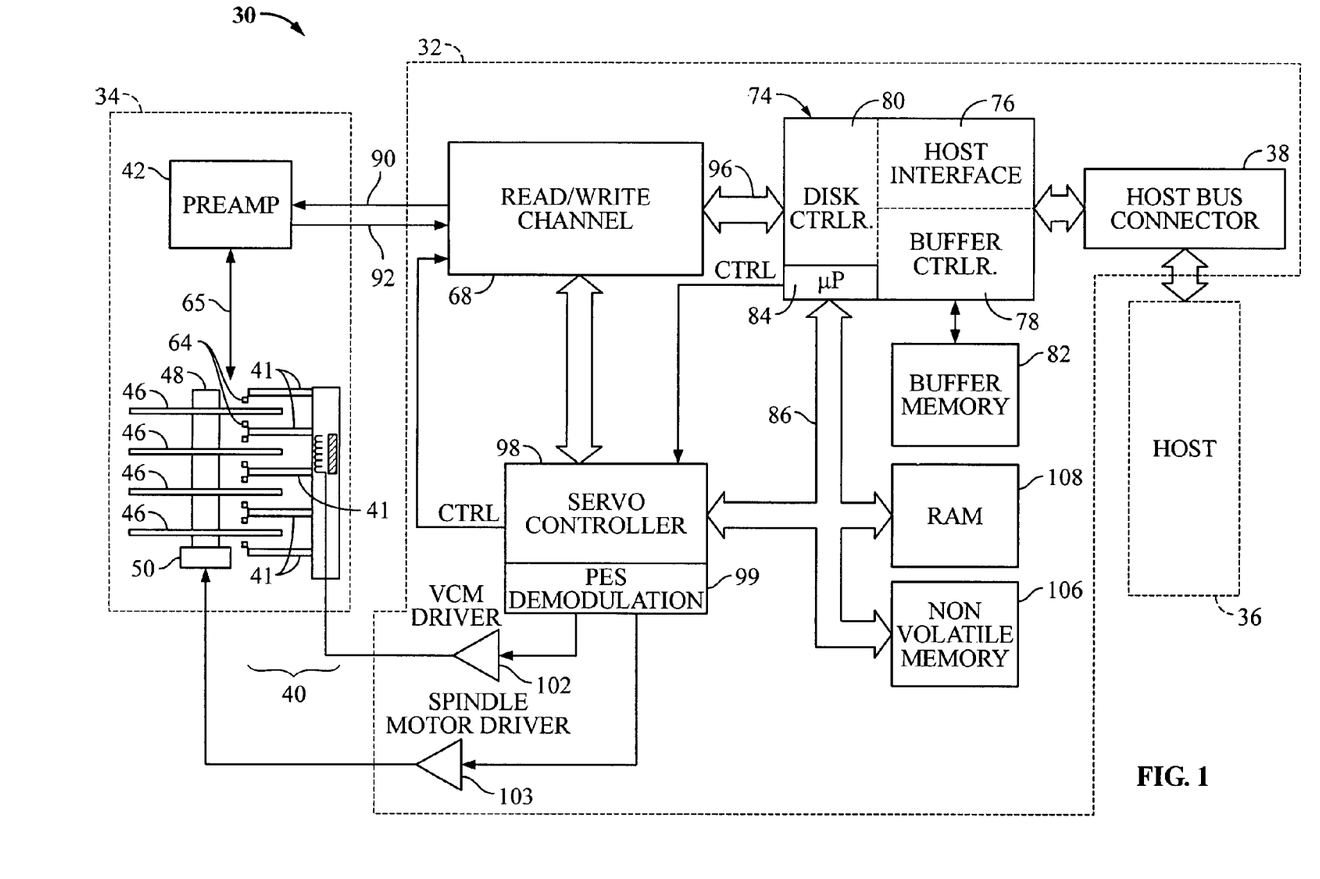
FIG. 1 shows a simplified block diagram of a disk drive, in which embodiments of the invention may be practiced.

FIG. 1 shows a simplified block diagram of disk drive 30, in which embodiments of the invention may be practiced. Disk drive 30 comprises a Head/Disk Assembly (HDA) 34 and a controller printed circuit board assembly (PCBA) 32. Host 36 may be a computing device 36 such as a desktop computer, a laptop computer, server computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

Servo controller 98 may operate under the control of a program or routine, including a PES demodulation program 99, to execute methods or processes in accordance with embodiments of the invention, as will be described later. These embodiments relate to servo control techniques to preserve position error signal (PES) continuity during track following operations. Further, microprocessor 84 may pre-program servo controller 98 and/or initialize the servo controller with initial and operational values for use in implementing these servo control techniques and may aid servo controller 98 in performing this functionality. Alternatively, microprocessor 84 may implement the servo control techniques.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc. Similarly, servo controller 98 need not be limited to servo control functions but may also provide other functionality such as management of the read/write channel as well other disk drive control functions.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

The servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sector sectors (termed "servo sectors") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86. Further, servo controller 98 may operate under the control of a program or routine, such as a PES demodulation program 99 to execute methods or processes in accordance with embodiments of the invention related to preserving PES continuity during track following operations, as will be described.

Figure 2:
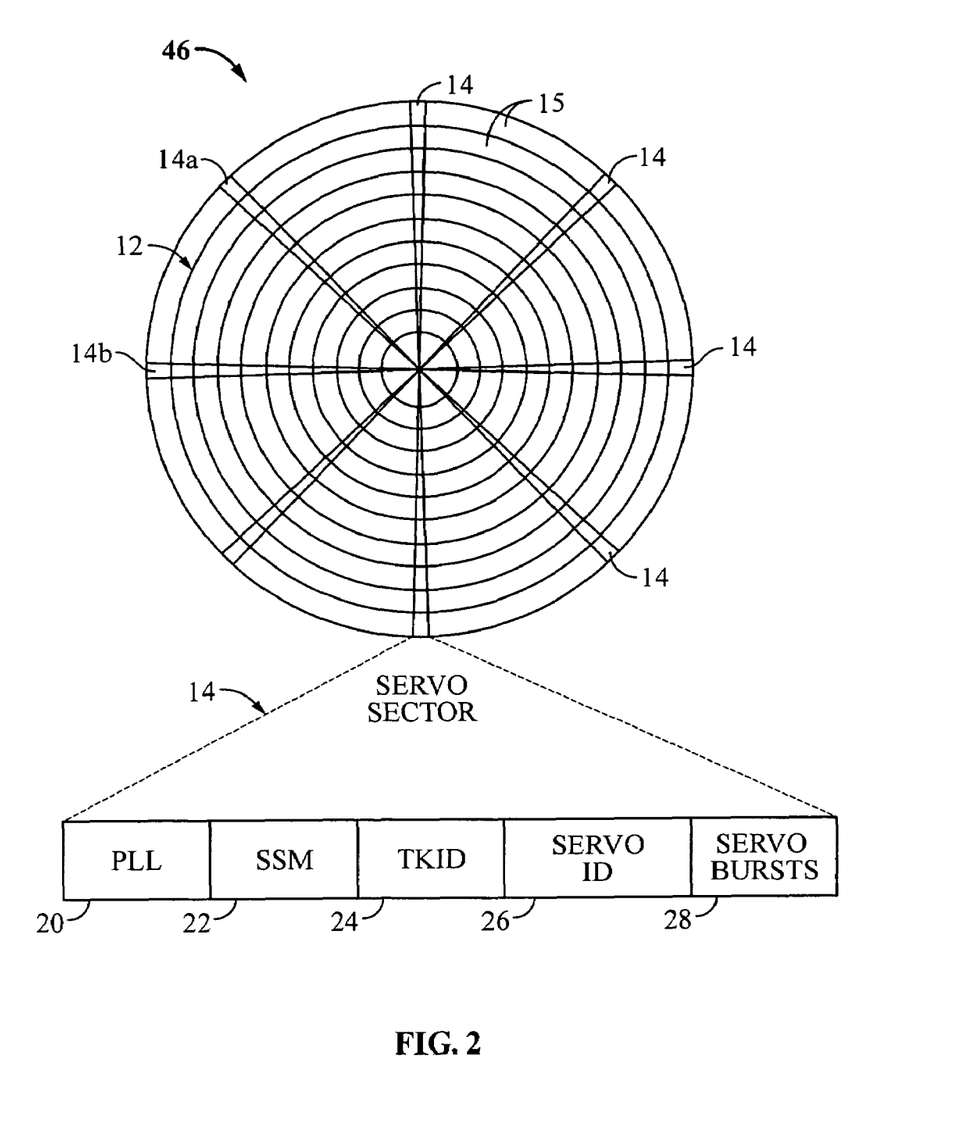
FIG. 2 is a diagram showing a disk of the disk drive of FIG. 1 having a plurality of concentric tracks, and more particularly, illustrates components of a servo sector.

With reference also to FIG. 2, FIG. 2 shows a disk 46 of the disk drive 30 of FIG. 1 having a plurality of concentric tracks, and more particularly, illustrates components of a servo sector 14. Disk 46 includes a plurality of concentric circumferential tracks 12. Each circumferential track 12 includes a plurality of embedded servo sectors 14 utilized in seeking and track following. The pluralities of servo sectors 14 are spaced sequentially around a circumference of the circumferential track 12. For example, embedded servo sectors 14*a*, 14*b*, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 includes phase lock loop (PLL) field 20, a servo synch mark (SSM) field 22, a track identification (TKID) field 24, a sector identifier (ID) 26, and a group of servo bursts 28, such as, an alternating pattern of magnetic transitions, that the servo control system samples to align the moveable transducer head with, and relative to, a particular track. Typically, servo controller 98 moves the transducer head 64 toward a desired track during a "seek" mode using the TKID field 24 as a control input.

In processing information, to ensure consistency in the detection of bits composing a block of bits, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM 22. The sector ID 26 is a binary encoded sector ID number to identify the sector.

Further, once the transducer head 64 is generally over a desired track 12, the servo controller 98 uses the servo bursts 28 to keep the transducer head 64 over the track in a "track follow" mode based upon demodulated PES values from the read servo bursts. During track following mode, the moveable transducer head 64 repeatedly reads the sector ID 26 of each successive servo sector to obtain the binary encoded sector ID number that identifies each sector of the track.

Based on the TKID and sector ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Figure 3A:
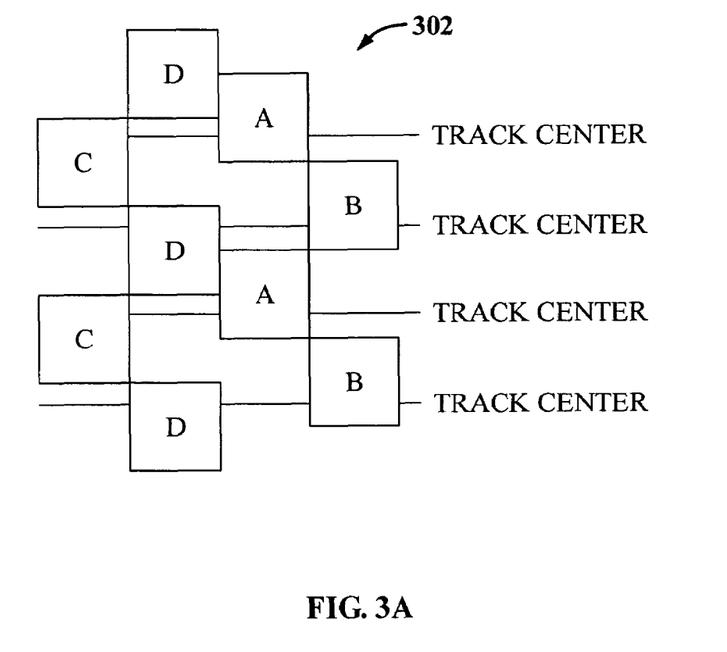
FIGS. 3A and 3B are diagrams showing examples of a four servo burst pattern and a two servo burst pattern, respectively.
Figure 3B:
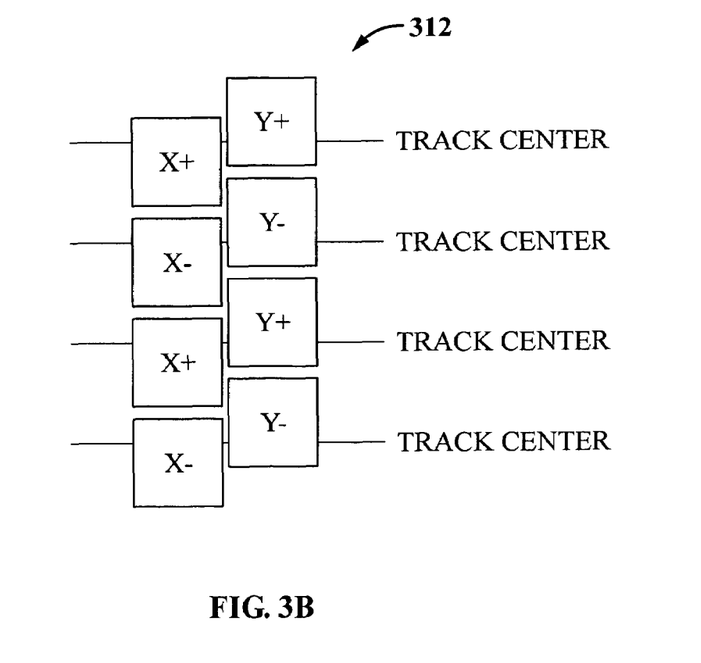

Turning briefly to FIGS. 3A and 3B, an example of a four servo burst pattern 302 and a two servo burst pattern 312 are illustrated that may be utilized in the servo sectors. As can be seen in FIG. 3A, in one embodiment, a group of four servo bursts (e.g. A, B, C, D), which serve as the alternating pattern of magnetic transitions that the servo controller 98 samples to align the movable transducer head with, and relative to, a particular track may be utilized. As can be seen in this example, each of the servo bursts (A, B, C, D) are placed near the track centers with an offset of a half-a-track from each other in the direction of the disk radius.

In another embodiment, aspects of the present invention may be utilized with a two servo burst pattern 312 as shown in FIG. 3B. As can be seen in FIG. 3B, the servo bursts are arranged around the track centers in a null-phase burst pattern. In the null-phase servo pattern, the "+/− signs" represent positive and negative phases, respectively.

The use of these two different servo burst patterns will be discussed in more detail later.

Figure 4:
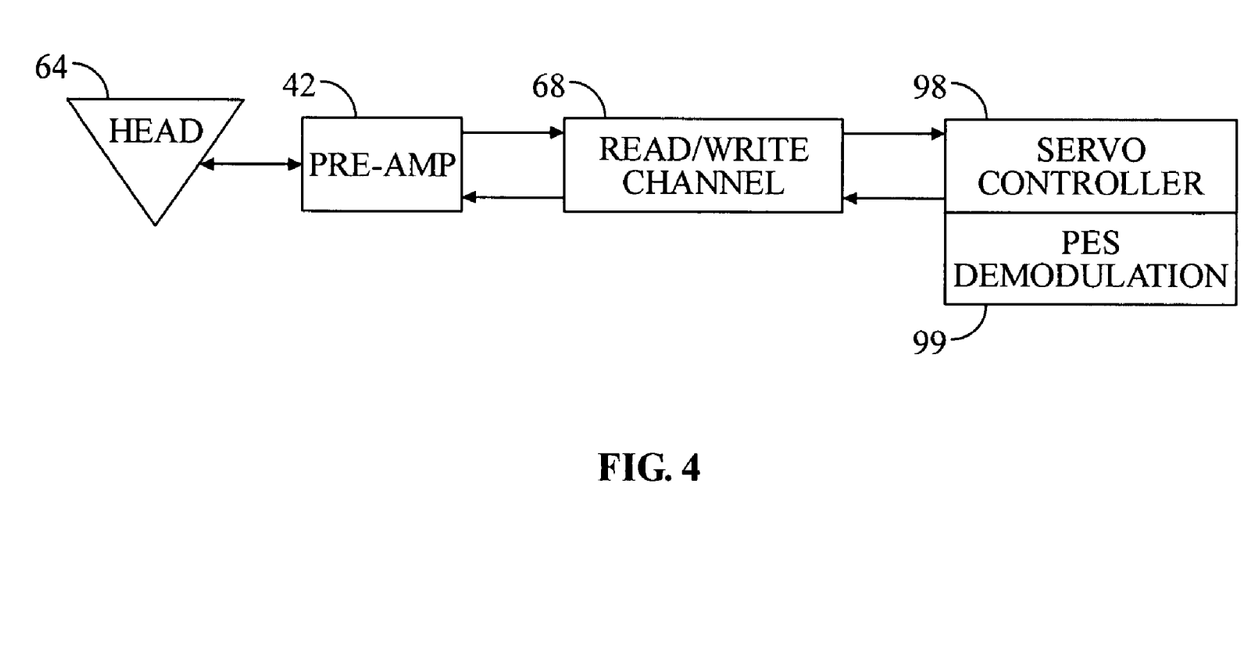
FIG. 4 shows a simplified block diagram of some of the components of the disk drive of FIG. 1, which are relevant to the description of the implementation of a servo control system, according to one embodiment of the present invention.

Turning now to FIG. 4, FIG. 4 illustrates a simplified example of some of the components of the previously described disk drive 30 that are relevant to the description of the implementation of the disk drive servo controller 98. As previously discussed, the servo controller 98 samples servo sectors at regular intervals to provide servo position information. Servo sectors are read by head 64, amplified by pre-amplifier 42, are received by read/write channel 68, and are processed by servo controller 98.

Servo controller 98 may operate under the control of a program or routine, such as a PES demodulation program 99, to execute methods or processes in accordance with embodiments of the invention. Embodiments of the invention relate to implementing servo control techniques to preserves PES continuity during track following operations. As previously discussed, the servo controller 98 is generally responsible for commanding seeking and track following operations via actuator assembly 40 and moveable head 64.

Is should be appreciated that embodiments of the invention may be implemented with servo controller and/or other circuitry, including microprocessor 84. Particularly, circuitry of the disk drive, including but not limited to servo controller 98 and/or microprocessor 84, may operate under the control of a program or routine to execute methods or processes in accordance with embodiments of the invention related to servo control techniques to preserve PES continuity during track following operations. For example, such a program may be implemented in firmware or software (e.g. stored in non-volatile memory 106 or other locations) and may be implemented by processors such as: servo controller 98, microprocessor 84, and/or other circuitry.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

Figure 5:
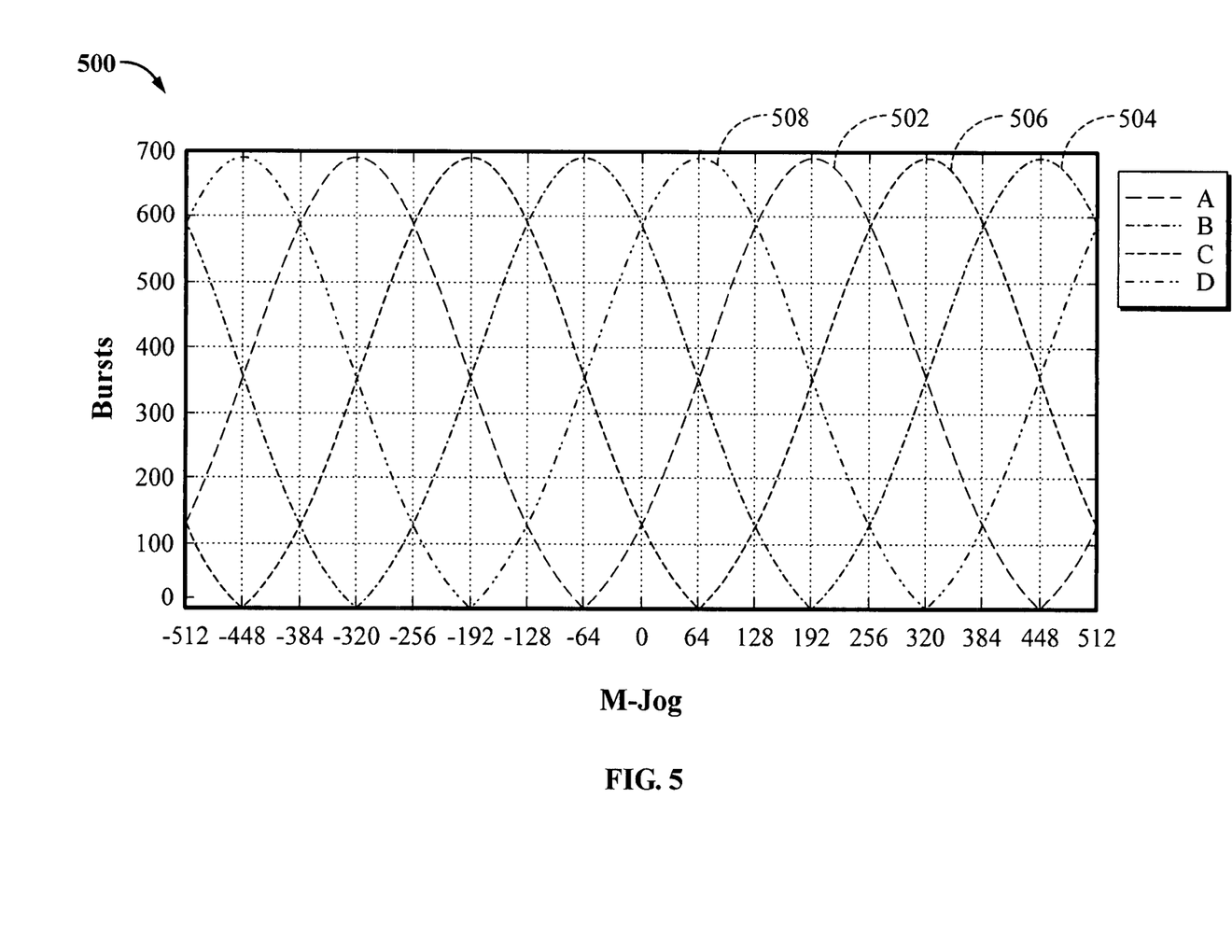
FIG. 5 is a graph showing the servo bursts profiles for the four servo burst pattern of FIG. 3A, as measured by the servo controller, when track following at different micro-jogs.

With reference to FIG. 5, FIG. 5 is a graph showing the servo burst profiles of the four servo burst pattern of FIG. 3A (e.g. A, B, C, D) as measured by the servo controller 98 when track following at different micro-jogs. As shown in FIG. 5, the y-axis is representative of the number of read servo bursts (for each servo burst A, B, C, D) and the x-axis is representative of micro-jogs, which is a measurement along the radius of the disk. In this example, there are 256 micro-jogs per track in the radial direction of the disk. Thus, in FIG. 5, servo bursts are measured for two track widths in either direction (as shown by the x-axis).

As can further be seen in FIG. 5, the sinusoidal nature of each read servo burst A 502, B 504, C 506 and D 508 is shown as the head 64 is moved across the tracks of the disk in the radial direction of the disk.

As will be described hereinafter, embodiments of the invention relate to a servo burst demodulation method to preserve PES continuity and linearity at track center, half track, and quarter track locations, as well as, generally in track following operations. By utilizing this methodology, glitches often found in PES measurements are removed. This results in a much more stable track following.

Particularly, a disk drive, a method, and a processor-readable medium are disclosed for implementing servo control techniques to preserve PES continuity during track following operations in a disk drive. In one embodiment, disk drive 30 includes a movable head 64, a disk 46, and a servo controller 98 that implements a PES demodulation program 99 to implement servo techniques to preserve PES continuity during track following operations. As previously discussed, the disk 46 includes a plurality of tracks 12 in which a substantial majority of the tracks include a plurality of servo sectors 14 having a plurality of servo bursts 28 that are utilized in track following operations.

Servo controller 98 controls track following operations with the movable head 64 and implements operations to preserve PES continuity during track following.

As will be described, these operations include: dividing tracks of the disk into a plurality of zones, in which each zone includes zone boundaries, and utilizing a PES equation for each zone to generate a PES value based upon read servo bursts. Particularly, each zone PES equation includes a normalizing factor to account for boundary conditions associated with zone boundaries to preserve PES value continuity between zones. Servo controller 98 may implement a PES demodulation program 99 to accomplish this functionality as will be described.

Figure 6:
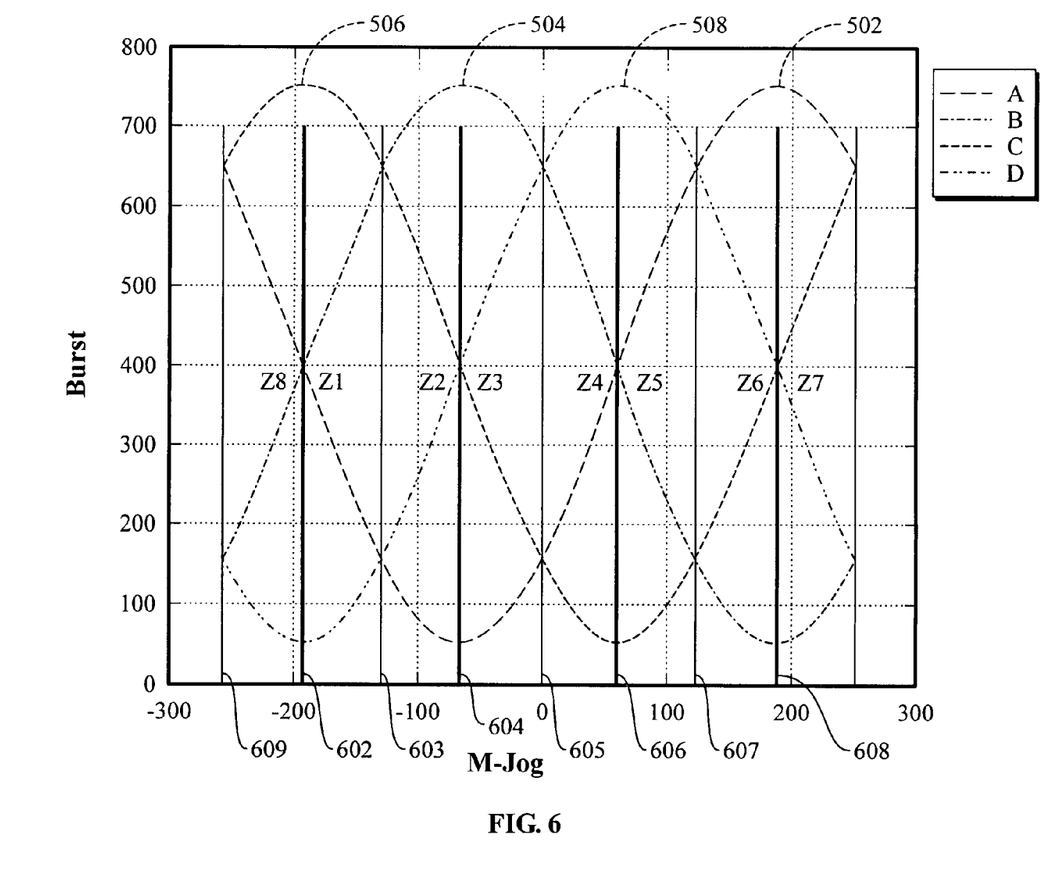
FIG. 6 is a graph showing the servo bursts patterns for the four servo bursts pattern case, as in FIG. 5, and in particular, illustrates two tracks of the disk divided into a plurality of zones, wherein each zone includes zone boundaries, to implement embodiments of the invention.

With reference now to FIG. 6, FIG. 6 is a graph showing the servo burst patterns for the four servo burst pattern case (e.g. A, B, C, D) as shown in FIG. 5, across two track widths. The y-axis shows the number of servo bursts read by the servo controller and the x-axis shows that these readings occur from −256 micro-jogs to 256 micro-jogs such that, as discussed with reference to FIG. 5, two track widths are read by the servo controller. Particularly, graphs for the servo bursts A 502, B 504, C 506, and D 508 are shown.

More particularly, as shown in FIG. 6, in implementing servo control techniques to preserve PES continuity during track following mode, the servo controller in performing track follow operations divides two tracks of the disk into a plurality of zones wherein each zone includes a pair of zone boundaries.

Even more particularly, each of the two tracks, as shown in FIG. 6 are divided by the servo controller 98 implementing the PES demodulation program 99 into four zones such that there are a total of eight zones: zone 1 (Z1), zone 2 (Z2), zone 3 (Z3), zone 4 (Z4), zone 5 (Z5), zone 6 (Z6), zone 7 (Z7) and zone 8 (Z8). Each of these zones includes zone boundaries. In this embodiment, there are four quarter-track boundaries shown as quarter-track boundaries 602, 604, 606 and 608 and four half-track boundaries shown as half-track boundaries 603, 605, 607 and 609.

Servo controller 98 implements demodulation program 99 that utilizes a PES equation for each zone to generate a PES value based upon read servo bursts, in which each zone PES equation includes a normalizing factor to account for boundary conditions associated with zone boundaries, which preserves and maintains PES value continuity during track following operations.

In one embodiment, these equations for each zone are shown as follows: Equation 1 (E1) corresponds to zone 1 (Z1); equation 2 (E2) corresponds to zone 2 (Z2); equation 3 (E3) corresponds to zone 3 (Z3); equation 4 (E4) corresponds to zone 4 (Z4); equation 5 (E5) corresponds to zone 5 (Z5); equation 6 (E6) corresponds to zone 6 (Z6); equation 7 (E7) corresponds to zone 7 (Z7); and equation 8 (E8) corresponds to zone 8 (Z8):

$$E1: -64 * (B + D - A - C)/(D - C)$$
$$E2: -64 * (B + D - A - C)/(A - B)$$
$$E3: -64 * (A + D - B - C)/(A - B)$$
$$E4: -64 * (A + D - B - C)/(C - D)$$
$$E5: -64 * (A + C - B - D)/(C - D)$$
$$E6: -64 * (A + C - B - D)/(B - A)$$
$$E7: -64 * (B + C - A - D)/(B - A)$$
$$E8: -64 * (B + C - A - D)/(D - C)$$

Associated with each equation and zone are boundary conditions as shown below:

Boundary Condition E1: $(C > D)$ & $(A <= B)$ & $(C - D > B - A)$
Boundary Condition E2: $(C > D)$ & $(A <= B)$ & $(C - D <= B - A)$
Boundary Condition E3: $(C <= D)$ & $(A < B)$ & $(B - A > D - C)$
Boundary Condition E4: $(C <= D)$ & $(A < B)$ & $(B - A < D - C)$
Boundary Condition E5: $(C <= D)$ & $(A > B)$ & $(D - C > A - B)$
Boundary Condition E6: $(C <= D)$ & $(A > B)$ & $(D - C <= A - B)$
Boundary Condition E7: $(C > D)$ & $(A > B)$ & $(A - B > C - D)$
Boundary Condition E8: $(C > D)$ & $(A > B)$ & $(A - B <= C - D)$ As can be seen above, each of the above equations E1-E8 has a normalizing factor in each equation's respective denominator. Particularly, looking at equations E1-E8, each has a normalization factor as follows: E1: (D−C); E2: (A−B); E3: (A−B); E4: (C−D); E5: (C−D); E6: (B−A); E7: (B−A); and E8: (D−C).

That is, each zone's (Z1-Z8) PES equation (E1-E8) includes a normalizing factor that accounts for boundary conditions associated with the zone boundaries Z1-Z8 such that PES value continuity is maintained both inside and between zones during track following by the servo controller. More particularly, as shown above, eight different PES equations (E1-E8) are utilized by the servo controller implementing the PES demodulation program such that a different PES equation of the eight different PES equations (E1-E8) is utilized for each one of the eight different zones (Z1-Z8) spread across two tracks, respectively.

Utilizing these equations, the PES values are continuous across center-track boundaries, half-track boundaries and quarter-track boundaries, as well as within the zones themselves. By utilizing the above-defined equations E1-E8 burst ratio continuity at each zone boundary is ensured such that PES continuity is preserved during track following.

Two brief examples will be given to demonstrate the continuity properties possessed by the above-described equations E1-E8.

As a first example, at a quarter track boundary, such as a zone boundary at zone 2 (Z2) and zone 3 (Z3), the equation definitions for zones 2 and 3 are:

$$(C>D)\&(A<=B)\&(C-D<=B-A), \text{Burst Ratio}=-64* (B+D-A-C)/(A-B) \quad \text{E2}$$

$$(C<=D)\&(A<=B)\&(D-C<=B-A), \text{Burst Ratio}=-64* (A+D-B-C)/(A-B) \quad \text{E3}$$

From these equations, it can be seen that inside these two zones (Z2 and Z3), the distance between A and B bursts are always greater than the distance between C and D bursts. Moreover, D-A is always positive. Therefore, the conditions (C-D<=D-A) and (D-C<B-A) are true for both E2 and E3. The difference between these two zones are distinguished by the other condition (C>D) or (C<=D). Thus, the zone boundary is C=D.

At the zone boundary, the burst ratio may be calculated by the equation in E2, which is 64, while the burst ratio calculated by the equation in E3 is -64. Hence, there is a fixed offset of 128 between them. This offset is compensated for in the PES equation by the servo controller implementing the PES demodulation program such that the PES value is always continuous at this quarter track boundary.

Similarly, at a track center boundary such as the boundary of zone 3 (Z3) and zone 4 (Z4), the equations for these are as follows:

$$(C<=D)\&(A<=B)\&(D-C<B-A), \text{Burst Ratio}=-64* (A+D-B-C)/(A-B) \quad \text{E3}$$

$$(C<=D)\&(A<=B)\&(D-C>=B-A), \text{Burst Ratio}=-64* (A+D-B-C)/(C-D) \quad \text{E4}$$

The above two zone equations are distinguished by the condition (D-C<B-A) or (D-C >=D-A) such that the zone boundary is at D-C=B-A.

At the zone boundary, the burst ratio calculated by the equation in E4 is 0, while the burst ratio calculated by the equation in E3 is 0 as well. Thus, no adjustment for the burst ratio for PES values is required. PES values are continuous at this track center boundary.

These same validations can be repeated on each boundary for each of the equations defined above. The results show that the PES values at each boundary are continuous. Thus, utilizing these equations, the PES demodulation program 99 of the servo controller 98 can perform track following operations in which the PES values during track following are continuous both inside zones and across zones. In this way, troublesome glitches are prevented.

It should be appreciated that the above equations E1-E8 utilize zone boundaries based upon bursts ratio equations used in adjacent zones, and that when utilized by a servo controller during track following, discontinuities at zone boundaries, even for imperfect burst profiles, are minimized such that PES continuity is preserved during track following operations.

Figure 7:
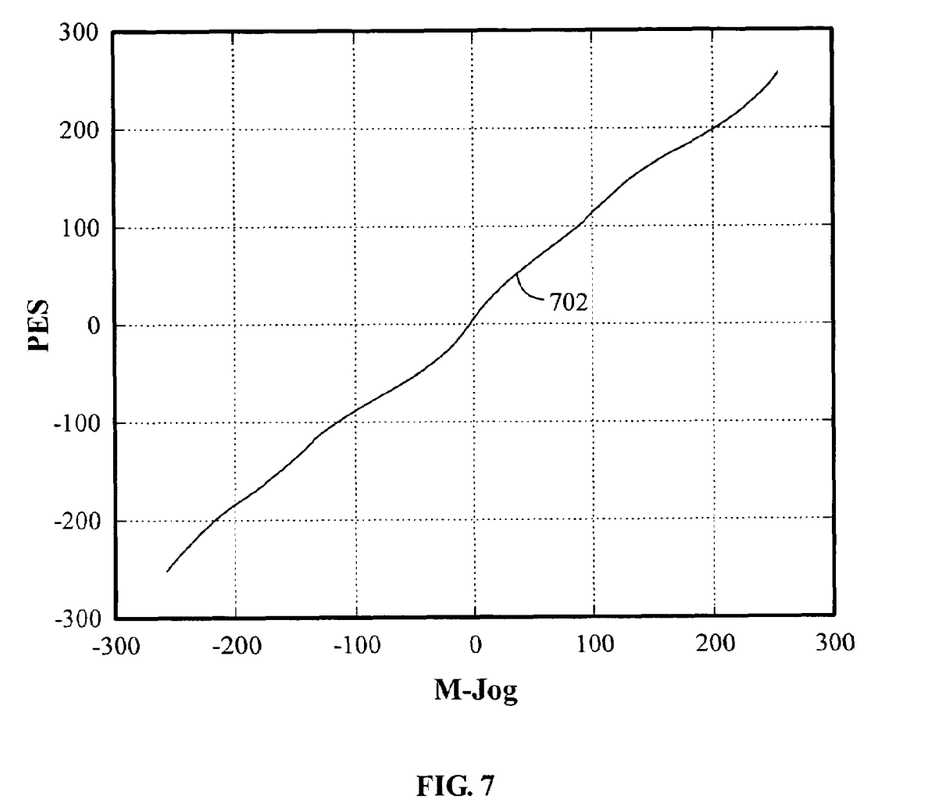
FIG. 7 is a graph that illustrates continuous PES values that occur during track following when implementing embodiments of the invention.

As an example of this, reference can be made to FIG. 7. FIG. 7 illustrates PES values for track following across two tracks and the previously-described zones. The y-axis shows the PES values and the x-axis spans two tracks in micro-jogs in the radial direction of the disk, (as discussed with reference to FIGS. 5 and 6).

As can be seen in FIG. 7, the PES values 702 demodulated by the servo controller 98 utilizing PES demodulation program 99 that utilizes the above-described equations E1-E8 show continuous PES values that can be accounted for in track following operations.

In another embodiment of the invention, as previously described, each servo sector may include two different servo bursts in a null-phase burst pattern that are utilized in track following operations. The null-phase burst pattern was previously discussed with reference to FIG. 3B. As will be described, the same equations E1-E8, based on the conventional four burst servo pattern (e.g. A, B, C, D), can easily be applied in the null-phase burst pattern.

In the null-phase burst pattern, the A, B, C, D bursts in the four bursts pattern are combined into two bursts X and Y via burst design, wherein magnetically X=A-B and Y=C-D. For example, null-phase burst patterns may improve format efficiently.

Utilizing this transformation, the equations E1-E8 are transformed as shown below:

| | |
|---|---|
| E1: $-64 * (X + Y)/(Y)$ | E2: $-64 * (-X - Y)/(X)$ |
| E3: $-64 * (X - Y)/(X)$ | E4: $-64 * (X - Y)/(Y)$ |
| E5: $-64 * (X + Y)/(Y)$ | E6: $-64 * (-X - Y)/(X)$ |
| E7: $-64 * (X - Y)/(X)$ | E8: $-64 * (X - Y)/(Y)$ |

And the zone boundaries are governed by the zone boundaries for equations E1-E8 as shown below:

| | | |
|---|---|---|
| Boundary Condition E1: (Y > 0) & | (X <= 0) & | (Y > -X) |
| Boundary Condition E2: (Y > 0) & | (X <= 0) & | (Y <= -X) |
| Boundary Condition E3: (Y <= 0) & | (X <= 0) & | (X < Y) |
| Boundary Condition E4: (Y <= 0) & | (X <= 0) & | (X >= Y) |
| Boundary Condition E5: (Y <= 0) & | (X > 0) & | (Y < -X) |
| Boundary Condition E6: (Y <= 0) & | (X > 0) & | (Y >= -X) |
| Boundary Condition E7: (Y > 0) & | (X > 0) & | (X > Y) |
| Boundary Condition E8: (Y > 0) & | (X > 0) & | (X <= Y) |

It should be noted that in this case, equations 2 and 6, 3 and 7, 4 and 8, and 1 and 5 are the same. Thus, in this embodiment only four different PES equations need to be utilized by the servo controller for the eight different zones spread across two tracks respectively.

Accordingly, this embodiment may add additional efficiency in servo control track following operations.

In all other respects, the null-phase servo burst pattern and the equations include all of the same properties including the preservation of PES continuity during track following operations, as previously-described with reference to the four servo burst embodiment.

The techniques described previously can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media.

We claim:

1. A disk drive comprising:
   a moveable head;

a disk having a plurality of tracks, a substantial majority of the tracks having a plurality of servo sectors including a plurality of servo bursts utilized in track following operations; and a servo controller to control track following operations with the moveable head, the servo controller to implement operations to preserve position error signal (PES) continuity during track following, the operations comprising:

dividing tracks of the disk into a plurality of zones, wherein each zone includes zone boundaries; and utilizing a plurality of PES equations to generate a PES value for each zone based upon read servo bursts, the PES equations comprising:

a first zone PES equation comprising $K*(B+D-A-C)/(D-C)$;

a second zone PES equation comprising $K*(B+D-A-C)/(A-B)$;

a third zone PES equation comprising $K*(A+D-B-C)/(A-B)$; and a fourth zone PES equation comprising $K*(A+D-B-C)/(C-D)$;

wherein K is a constant determined by the zone boundaries; and A, B, C, and D are servo burst values.

2. The disk drive of claim 1, wherein each servo sector includes four different servo bursts utilized in track following operations.

3. The disk drive of claim 2, wherein each track is divided into four zones.

4. The disk drive of claim 3, wherein eight different PES equations are utilized by the servo controller such that a different PES equation of the eight different PES equations is utilized for each one of eight different zones spread across two tracks, respectively.

5. The disk drive of claim 4, wherein PES values are continuous across center-track boundaries, half-track boundaries, and quarter-track boundaries.

6. The disk drive of claim 1, wherein each servo sector includes two different servo bursts in a null-phase burst pattern utilized in track following operations.

7. The disk drive of claim 6, wherein each track is divided into four zones.

8. The disk drive of claim 7, wherein four different PES equations are utilized by the servo controller for eight different zones spread across two tracks, respectively.

9. The disk drive of claim 6, wherein the two servo bursts comprise X and Y bursts and $X=A-B$ and $Y=C-D$.

10. The disk drive of claim 1, further comprising:

a fifth zone PES equation comprising $K*(A+C-B-D)/(C-D)$;

a sixth zone PES equation comprising $K*(A+C-B-D)/(B-A)$;

a seventh zone PES equation comprising $K*(B+C-A-D)/(B-A)$; and an eighth zone PES equation comprising $K*(B+C-A-D)/(D-C)$.

11. The disk drive of claim 1, wherein $K=-64$.

12. A method for performing track following operations in a disk drive comprising:

moving a head relative to a disk having a plurality of tracks, a substantial majority of the tracks having a plurality of servo sectors including a plurality of servo bursts utilized in track following operations;

controlling track following operations with the moveable head in order to preserve position error signal (PES) continuity by:

dividing tracks of the disk into a plurality of zones, wherein each zone includes zone boundaries; and generating a PES value based upon read servo bursts according to PES equations comprising:

a first zone PES equation comprising $K*(B+D-A-C)/(D-C)$;

a second zone PES equation comprising $K*(B+D-A-C)/(A-B)$;

a third zone PES equation comprising $K*(A+D-B-C)/(A-B)$; and a fourth zone PES equation comprising $K*(A+D-B-C)/(C-D)$;

wherein K is a constant determined by the zone boundaries; and A, B, C, and D are servo burst values.

13. The method of claim 12, wherein each servo sector includes four different servo bursts utilized in track following operations.

14. The method of claim 13, wherein each track is divided into four zones.

15. The method of claim 14, wherein eight different PES equations are utilized such that a different PES equation of the eight different PES equations is utilized for each one of eight different zones spread across two tracks, respectively.

16. The method of claim 15, wherein PES values are continuous across center-track boundaries, half-track boundaries, and quarter-track boundaries.

17. The method of claim 12, wherein each servo sector includes two different servo bursts in a null-phase burst pattern utilized in track following operations.

18. The method of claim 17, wherein each track is divided into four zones.

19. The method of claim 18, wherein four different PES equations are utilized for eight different zones spread across two tracks, respectively.

20. The method of claim 17, wherein the two servo bursts comprise X and Y bursts and $X=A-B$ and $Y=C-D$.

21. The method of claim 12, wherein the PES equations further comprise:

a fifth zone PES equation comprising $K*(A+C-B-D)/(C-D)$;

a sixth zone PES equation comprising $K*(A+C-B-D)/(B-A)$;

a seventh zone PES equation comprising $K*(B+C-A-D)/(B-A)$; and an eighth zone PES equation comprising $K*(B+C-A-D)/(D-C)$.

22. The method of claim 12, wherein $K=-64$.

* * * * *